United States Patent

[11] 3,612,711

| [72] | Inventor | Hubert Meier<br>Hilzingen, Germany |
|---|---|---|
| [21] | Appl. No. | 868,770 |
| [22] | Filed | Oct. 23, 1969 |
| [45] | Patented | Oct. 12, 1971 |
| [73] | Assignee | Maschinenfabrik Fahr Aktiengesellschaft<br>Gottmadingen, Germany |
| [32] | Priority | Nov. 8, 1968 |
| [33] | | Germany |
| [31] | | P 18 07 874.5 |

[54] WINNOWING BLOWER
5 Claims, 2 Drawing Figs.

[52] U.S. Cl. ........................................... 415/97,
130/27
[51] Int. Cl. .......................................... F01d 3/02
[50] Field of Search ............................ 415/97, 98,
99, 102; 130/27 HF, 27 Z

[56] References Cited
UNITED STATES PATENTS

| 1,029,554 | 6/1912 | Neumayer | 415/98 |
| 1,806,860 | 5/1931 | Montgomery | 415/98 |
| 2,143,100 | 1/1939 | Anderson | 415/98 |
| 2,727,680 | 12/1955 | Madison et al. | 415/98 |
| 2,849,118 | 8/1958 | Ashton | 130/27 F |
| 3,109,433 | 11/1963 | Claas | 130/27 Z |
| 3,246,605 | 4/1966 | Fisher | 415/102 |

Primary Examiner—C. J. Husar
Attorney—Karl F. Ross

ABSTRACT: A winnowing blower for combine harvesters or the like comprises an approximately semicylindrical housing with axial fans at its two ends.

PATENTED OCT 12 1971 3,612,711

Inventor:
Hubert Hafer

BY Karl F. Ross

ATTORNEY

WINNOWING BLOWER

The present invention relates to winnowing blowers for combine harvesters comprising an approximately part-cylindrical housing, an axial air inlet and an air outlet directed transversely in relation to the axis of the housing.

Winnowing blowers as used in combine harvesters are usually constructed in the form of centrifugal fans. They are arranged under the bottom part of the harvester in a direction transverse to the direction of travel and are therefore subject to damage by stones or contacting the ground on passing over uneven terrain. Damages to the blower are likely to have a direct effect on the vanes or blades of the fan which extend across the whole width of the combine harvester. This leads to trouble in operation.

One object of the present invention is to provide a winnowing blower which is less sensitive to denting of the housing than previously proposed blowers.

A winnowing blower according to my invention comprises a set of fan or propeller blades at each end of its generally cylindrical housing axially drawing air into the space between the two fans from which the air is discharged through an outlet slot in the cylindrically curved housing wall, the air outlet opening into a nozzle with converging top and bottom walls which integrally merge into the housing periphery at points spaced a little more than 180° apart. In this arrangement the vanes blades lie protected in the end parts of the housing, on opposite sides of the outlet slot, behind ring-segmental baffles which are curved about the housing axis and form integral, axially outwardly bent extensions of two diverging end walls of the nozzle. The nozzle mouth defined by the diverging end walls and the converging top and bottom walls is coextensive with the blower housing. As a combine harvester.

The best rate of air delivery to the nozzle mouth is obtained with a ratio intake cross section to nozzle-mouth area is at least approximately 1.4:1. The term "intake cross section" designates the combined area of the two open housing ends.

Further important features and details of the invention will become apparent from the following description given with reference to the accompanying drawing in which.

Figure 1:
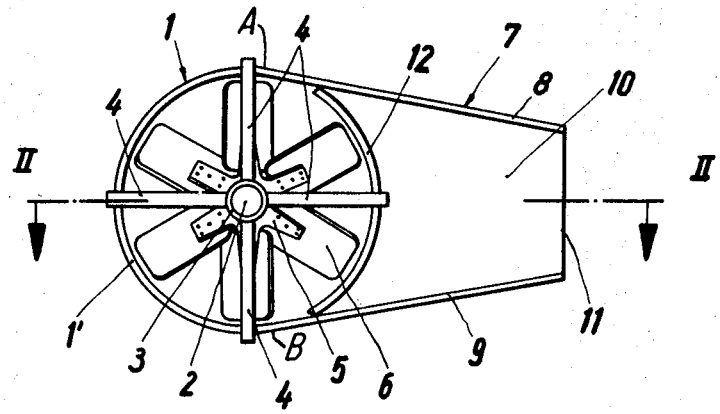
FIG. 1 is a side view of a winnowing blower embodying my invention.
Figure 2:
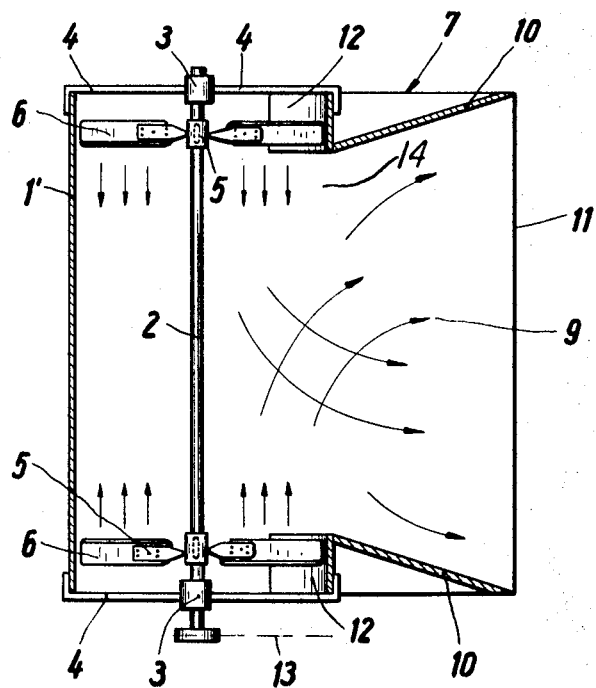
FIG. 2 is a longitudinal sectional view through the blower taken on the line II—II of FIG. 1.

The diagrammatic drawing shows a winnowing blower for a nonillustrated combine harvester. In a blower housing 1 a shaft 2 is journaled for rotation. The housing 1 is in the form of a semicylindrical structure 1' which coaxially surrounds the shaft 2. At the open ends of the housing 1, bearings 3 for the shaft 2 are supported by means of narrow connecting pieces 4 spanning the open ends of the housing 1. On the shaft 2 two propellers 5 are arranged near the ends of the housing. The blades or vanes 6 of the propellers are of opposite hand so that, on rotation of the shaft 2, air currents are produced which are directed axially inwardly toward the center. Between the wall of the housing 1 and the sweep diameter of the propellers 5 there is only a small gap.

The peripheral housing wall 1' is formed at one side with an air outlet 14 opening into a nozzle 7 whose upper wall 8 and lower wall 9 merge tangentially with the wall 1' at points A, B, slightly more than 180° apart, and converge towards each other in an outward direction away from the housing axis, in planes parallel to that axis. The end walls 10 of the nozzle 7 cooperate in forming a define with the upper and lower walls 8, 9 a blower mouth 11 extending over the whole breadth of the winnowing blower.

Slot 14 is flanked by a pair of arcuate baffle plates 12 which extend over nearly half a circle coaxially around the blades 6 of the respective propeller 5 with small clearance and effectively are a continuation of the peripheral housing wall. In an axial direction each baffle 12 extends from the outer edge of the housing 1 the planes of the inner blade edges of the corresponding propeller 5. The baffles 12 are rigid with the end walls 10 of the nozzle 7. In order that the end of the nozzle may have the same width as the housing 1, the side walls 10 diverge in an outward direction.

The manner of operation of the winnowing blower embodying the invention is as follows.

The shaft 2 with the propellers 5 of the blower, extending over the whole breadth of the combine harvester under its bottom part, is driven via a V-belt drive 13 from a shaft of the combine harvester. The propellers 5 draw the air in and, owing to their mirror-symmetrical arrangement in the housing, convey the air to the region of slot 14. The two axially directed air currents meet each other and are automatically diverted radially. The quantity of air leaving the nozzle 7 is evenly distributed over the whole breadth of the blower mouth 11 and passes through the material lying on the screens of the combine harvester. The even distribution of air enhances the performance of the screens and the winnowing effect. The rotating fan blades of the blower are offset from the parts of the intermediate housing which may be subjected to denting.

I claim:

1. A blower comprising a generally cylindrical housing with a cylindrically curved peripheral wall and two open ends; a pair of fans coaxially mounted in said housing adjacent said open ends for aspirating air therethrough into the interior of said housing, said peripheral wall forming a lateral slot between said fans; and a nozzle integral with said housing extending laterally outwardly from said slot, said nozzle having a pair of walls parallel to the housing axis converging outwardly from said slot and merging tangentially into said peripheral wall at locations spaced slightly more than 180° apart.

2. A blower as defined in claim 1 wherein said peripheral wall is extended in the region of said open ends by a pair of arcuate baffle plates centered on the housing axis and bounding said slot, said nozzle having a pair of end plates joined to said baffled plates at the boundaries of said slot.

3. A blower as defined in claim 2 wherein end walls diverge from said slot outwardly and define with said converging walls a nozzle mouth remote from said slot, the axial length of said nozzle mouth being substantially the same as that of said peripheral wall.

4. A blower as defined in claim 2 wherein said fans have propeller blades with inner edges in transverse planes substantially coinciding with said boundaries.

5. A blower as defined in claim 4 wherein the propeller blades of said fans are mirror-symmetrically disposed.